United States Patent Office 2,758,051
Patented Aug. 7, 1956

2,758,051

SUBSTITUTED 1 - BENZOYL - 2 - PHENYL - HYDRAZINE FUNGICIDAL COMPOSITIONS AND METHOD OF APPLYING TO PLANTS

Allen E. Smith, Oxford, George E. O'Brien, Bethany, and Adelaide Bornmann, New Haven, Conn., assignors to United States Rubber Company, New York, N. Y., a corporation of New Jersey No Drawing. Application March 17, 1953,
Serial No. 342,983

9 Claims. (Cl. 167—30)

This invention relates to new and useful improvements in fungicides. The invention further relates to methods of treating growing plants, an to methods of protecting organic material subject to attack by microorganisms, as the immunizing of seed.

We have found that 1-benzoyl-2-phenyl hydrazines in which a hydroxy, carboxy, alkoxy, nitro or alkyl substituent is in position ortho to the carbonyl group, are effective fungicides. In addition to such ortha substituent in the benzoyl group, the benzoyl group may be further substituted by selection from the class consisting of halo, nitro, hydroxy, carboxy, alkoxy and alkyl radicals. Generally, there will not be more than one such other substituent in the benzoyl group. The phenyl group attached to the nitrogen is unsubstituted.

The chemicals of the present invention may be used as seed protectants and disinfectants, and to protect growing plants from fungus infection. They may be applied to seeds and plants directly, or in an inert medium as a dust in admixture with a powdered solid carrier, such as the various mineral silicates, e. g., mica, talc, pyrophyllite and clays. They may be applied as aqueous sprays in suspension in water. They may be applied in admixture with small amounts of a surface-active agent which may be an anionic surface-active agent, a non-ionic surface-active agent, or a cationic surface-active agent, and which acts as a wetting agent for the chemical. Such surface-active agents are well known and reference is made to U. S. Patent 2,547,724, columns 3 and 4, for more detailed examples of the same. They may be applied as in foliage treatment in an aqueous suspension containing such a surface-active agent as a dispersing agent. The chemicals of the invention may also be admixed with powdered solid carriers, such as mineral silicates, together with a small amount of such a surface-active agent so that a wetable powder may be obtained which may be applied directly to plants, or which may be shaken up with water to readily prepare a suspension of the chemical (and powdered carrier) in water for application to plants in that form. The chemicals may be applied to plants by the aerosol method.

The chemicals of the present invention may be made by reacting equal molar amounts of phenyl hydrazine and a halide, anhydride or ester of the selected ortho-substituted benzoic acid. Examples of the preparation of such chemicals are as follows:

*Preparation of 1-(2-hydroxybenzoyl)-2-phenyl hydrazine*

A mixture of phenyl salicylate (107 g., 0.5 mol), phenylhydrazine (54 g., 0.5 mol), and 1-methylnaphthalene (175 g.) was refluxed for five hours. The hot mixture was treated with decolorizing carbon, filtered, and diluted to one liter with petroleum ether. After a few hours an off-white crystalline solid separated. This was collected and washed with ligroin. Yield 50 grams, melting point 127–128° C.

*Preparation of 1-(2-carboxybenzoyl)-2-phenyl hydrazine*

Thirty-two and four-tenths grams of phenyl hydrazine (.3 mol) in 40 ml. chloroform was added with stirring to 44.4 grams of phthalic anhydride (.3 mol) dissolved in 400 ml. chloroform. Heat was evolved and a white precipitate came out of the solution. After standing at room temperature four hours, the crystalline product was filtered and washed with a small amount of chloroform. The product was air dried, giving a yield of 56 grams (73% yield), M. P. 153° C. with evolution of a gas.

*Preparation of 1-(2-nitrobenzoyl)-2-phenyl hydrazine*

A solution of 2-nitrobenzoyl chloride (245 g., 1.2 mols) in 150 ml. of benzene was added gradually to a mixture of phenyl hydrazine (132 g., 1.2 mols), pyridine (100 g., 1.2 mols) and 450 ml. of benzene. An exothermic reaction took place. The reaction mixture was stirred for an additional two hours without external heating, then treated with 700 ml. of water. The three-phase system was mixed well, and the water layer was separated and discarded. The organic material was concentrated under reduced pressure to remove benzene, and the remaining paste was slurried with alcohol. A yellow crystalline solid separated and was collected by filtration. This product (150 grams) was washed with dilute sodium bicarbonate solution, and recrystallized from alcohol. Yield 96 g., melting point 140–142° C.

*Preparation of 1-(2-ethoxybenzoyl)-2-phenyl hydrazine*

A solution of 2-ethoxybenzoyl chloride (61 g., 0.33 mol in 40 ml. of benzene was added to a mixture of pyridine (28 g., 0.35 mol), phenyl hydrazine (36 g., 0.33 mol) and 300 ml. of benzene. An exothermic reaction took place. The mixture was refluxed for four and one-half hous, allowed to cool, and 200 ml. of water was added. The two-phase system was mixed well and the aqueous layer discarded. The organic layer was washed with dilute hydrochloric acid, dried, and concentrated under reduced pressure. The pasty residue was crystallized twice from methanol. The white product weighed 32 grams and melted at 106–109° C.

*Preparation of 1 - (2 - carboxymonochlorobenzoyl) - 2-phenyl hydrazine*

A solution of phenyl hydrazine (108 g., 1.0 mol) in 80 ml. of chloroform was added to a mixture of chloroform (800 ml.) and technical monochlorophthalic anhydride (182.5 g., 1.0 mol), which contained both the 3- and 4-chloro isomers. An exothermic reaction took place. The solution was concentrated at room temperature, under reduced pressure. The crystalline white product separated and was collected and dried; M. P. 175–177° C. with evolution gas.

Examples of other compounds similarly prepared are: 1 - (2 - methylbenzoyl)-2-phenylhydrazine, 1-(2-nitro-4-hydroxybenzoyl) - 2-phenylhydrazine, 1 - (2-carboxy-6-nitrobenzoyl)-2-phenylhydrazine, 1-(2-hydroxy-5-chlorobenzoyl)-2-phenylhydrazine, 1-(2-methoxy-3-methylbenzoyl) - 2 - phenylhydrazine, 1-(2-ethyl-4-nitrobenzoyl-2-phenylhydrazine, 1 -(2 - hydroxy - 4-carboxybenzoyl)-2-phenylhydrazine, 1 - (2,4-dinitrobenzoyl)-2-phenylhydrazine.

The effectiveness of the chemicals of the invention as fungicides is illustrated in the following examples:

*Example I*

The chemicals to be tested were ground with 7.5% by weight of the chemical of an alkyl phenoxy polyoxyethylene ethanol (monoether of a polyglycol with an alkylated phenol) which is a surface-active agent known to possess no fungicidal properties in the amount used. The mixture of surface-active agent and test chemical was dispersed by agitating in distilled water at a concentration of 2000 parts per million of the chemical.

Duplicate six-inch tomato plants of the variety Bonny Best were sprayed for 20 seconds at 20 pounds pressure with the thus prepared aqueous suspension of each fungicide. After the spray deposit was thoroughly dry (24 hours), the plants and four comparable untreated (check) plants were sprayed with an aqueous suspension of spores of the early blight fungus (*Alternaria solani*). The plants were held for 24 hours at 21° C. and 100% relative humidity to permit spore germination and host infection before removing the plants to the greenhouse. Records were taken five days later on the number of lesions produced on the 15 major leaflets of the three youngest fully expanded leaves. These data were converted to percentage of control on the basis of the average number of fungus lesions on the four check plants.

The percent fungus control by the various chemicals of the invention is shown in the following table:

| Treatment Chemical | Percent Fungus Control |
|---|---|
| 1-(2-hydroxybenzoyl)-2-phenyl hydrazine | 96 |
| 1-(2-carboxymonochlorobenzoyl)-2-phenyl hydrazine | 92 |
| 1-(2-ethoxybenzoyl)-2-phenyl hydrazine | 76 |
| 1-(2-nitrobenzoyl)-2-phenyl hydrazine | 100 |

*Example II*

The fungicide to be tested was finely ground and applied dry at the rate of 4 ounces of fungicide to 100 lbs. of corn seed. Distribution of the fungicide on seed surface was accomplished by tumbling seed plus fungicide for 30 minutes on a seed treatment wheel. Using a planned randomization scheme 8 replicates of 25 seeds each were then planted in flats containing naturally contaminated soil. They were placed in a cold chamber and maintained at 50° F. and 100% relative humidity for fourteen days. After removal from the cold chamber, the flats were placed in the greenhouse to complete emergence. Stand counts were made after seven to ten days.

The stand from seeds treated with 1-(2-hydroxybenzoyl)-2-phenyl hydrazine was 96%, whereas the stand of untreated (control) seeds was 49%.

Having thus described our invention, what we claim and desire to protect by Letters Patent is:

1. The method of controlling fungi on plants which comprises applying to plants that are subject to attack by fungi a fungicidal amount of a 1-benzoyl-2-phenyl hydrazine having a substituent in the benzoyl group in position ortho to the carbonyl group selected from the group consisting of hydroxy, carboxy, methoxy, ethoxy, nitro, methyl and ethyl radicals and having not more than one other substituent in the benzoyl group selected from the group consisting of chloro, nitro, hydroxy, carboxy and methyl radicals, the phenyl group attached to the nitrogen being unsubstituted.

2. The method for suppressing the growth of fungi on living plants which are subject to attack by fungi with a fungicidal amount of a 1-benzoyl-2-phenyl hydrazine having a substituent in the benzoyl group in position ortho to the carbonyl group selected from the group consisting of hydroxy, carboxy, methoxy, ethoxy, nitro, methyl and ethyl radicals and having not more than one other substituent in the benzoyl group selected from the group consisting of chloro, nitro, hydroxy, carboxy and methyl radicals, the phenyl group attached to the nitrogen being unsubstituted.

3. A fungicidal composition comprising a 1-benzoyl-2-phenyl hydrazine having a substituent in the benzoyl group in position ortho to the carbonyl group selected from the group consisting of hydroxy, carboxy, methoxy, ethoxy, nitro, methyl and ethyl radicals and having not more than one other substituent in the benzoyl group selected from the group consisting of chloro, nitro, hydroxy, carboxy and methyl radicals, the phenyl group attached to the nitrogen being unsubstituted, and a fungicidal adjuvant therefor, said adjuvant comprising a surface-active wetting agent.

4. The fungicidal composition of claim 3 in which the adjuvant includes a powdered solid carrier.

5. A fungicidal composition comprising 1-(2-hydroxybenzoyl)-2-phenyl hydrazine and a fungicidal adjuvant therefor, said adjuvant comprising a surface-active wetting agent.

6. A fungicidal composition comprising 1-(2-nitrobenzoyl)-2-phenyl hydrazine and a fungicidal adjuvant therefor, said adjuvant comprising a surface-active wetting agent.

7. A fungicidal composition comprising 1-(2-ethoxybenzoyl)-2-phenyl hydrazine and a fungicidal adjuvant therefor, said adjuvant comprising a surface-acting wetting agent.

8. A fungicidal composition comprising 1-(2-carboxybenzoyl)-2-phenyl hydrazine and a fungicidal adjuvant therefor, said adjuvant comprising a surface-active wetting agent.

9. A fungicidal composition comprising 1-(2-carboxymonochlorobenzoyl)-2-phenyl hydrazine and a fungicidal adjuvant therefor, said adjuvant comprising a surface-active wetting agent.

References Cited in the file of this patent

FOREIGN PATENTS 460,521    Great Britain _____ 1937

OTHER REFERENCES

Siegler et al.: Journal of Economic Entomology, vol. 39, No. 3, June 1946, pages 416, 417.

Frear, D. E. H.: Chemistry of Insecticides, Fungicides and Herbicides, 2nd ed., Sept. 1948, pages 108–122.

Beilstein, vol. 15, page 274.